United States Patent
Ferenc

(10) Patent No.: US 10,189,385 B2
(45) Date of Patent: Jan. 29, 2019

(54) VEHICLE SEAT

(71) Applicant: Brose Fahrzeugteile GmbH & Co. Kommanditgesellschaft, Coburg, Coburg (DE)

(72) Inventor: Anthony Ferenc, Goodrich, MI (US)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 230 days.

(21) Appl. No.: 14/878,252

(22) Filed: Oct. 8, 2015

(65) Prior Publication Data
US 2017/0101033 A1  Apr. 13, 2017

(51) Int. Cl.
*B60N 2/68* (2006.01)
*B60N 2/16* (2006.01)

(52) U.S. Cl.
CPC ............ *B60N 2/682* (2013.01); *B60N 2/165* (2013.01); *B60N 2/1615* (2013.01)

(58) Field of Classification Search
CPC ... B60N 2/12; B60N 2/16; B60N 2/68; B60N 2/682
USPC ....................... 297/452.18, 344.15
See application file for complete search history.

(56) References Cited

U.S. PATENT DOCUMENTS

| | | | |
|---|---|---|---|
| 3,819,229 A * | 6/1974 | Rogers, Jr. ............ | A61G 15/02 297/84 |
| 5,690,459 A | 11/1997 | Donovan et al. | |
| 6,077,014 A | 6/2000 | Gulistan | |
| 6,264,275 B1 * | 7/2001 | Frohnhaus ........... | B60N 2/1615 297/344.12 |
| 6,698,081 B2 | 3/2004 | Oates et al. | |
| 8,322,675 B2 | 12/2012 | Ducreuzot | |
| 9,045,061 B2 | 6/2015 | Kostin et al. | |
| 9,248,763 B2 * | 2/2016 | Paluch ................ | B60N 2/1615 |
| 9,481,268 B2 * | 11/2016 | Furuta ................ | B29C 65/7829 |
| 2004/0135411 A1 | 7/2004 | Hensley et al. | |
| 2008/0307624 A1 | 12/2008 | Lee | |

(Continued)

FOREIGN PATENT DOCUMENTS

| DE | 197 27 310 A1 | 1/1999 |
|---|---|---|
| DE | 103 21 745 A1 | 8/2004 |
| DE | 20 2005 009 185 U1 | 11/2006 |

(Continued)

OTHER PUBLICATIONS

International Search Report issued in corresponding PCT Application No. PCT/EP2016/073927 dated Feb. 6, 2017 (5 pages) and Written Opinion (5 pages).

*Primary Examiner* — Milton Nelson, Jr.
(74) *Attorney, Agent, or Firm* — Lewis Roca Rothgerber Christie LLP

(57) ABSTRACT

A vehicle seat includes a seat part for providing a seat surface for a seat occupant, the seat part including two side parts 21 between which a cross tube 5, 6 extends along a pivot axis, and an adjustment mechanism including a plurality of rockers 31 which are pivotably coupled to the seat part. The cross tube 5, 6 is divided into a long tube element 5 and a short tube element 6. The long tube element 5 extends between the side parts 21 of the seat part and is inserted into openings 210 of the side parts 21. The short tube element 6 is connected in a torsionally locked manner both to a first rocker 31 and to the long tube element 5.

8 Claims, 2 Drawing Sheets

(56) References Cited

U.S. PATENT DOCUMENTS

2014/0232163 A1* 8/2014 Eckhoff .................. B60N 2/68
297/452.19

FOREIGN PATENT DOCUMENTS

| | | |
|---|---|---|
| DE | 10 2010 008 676 A1 | 10/2010 |
| DE | 10 2013 001 416 A1 | 7/2014 |
| DE | 10 2013 209 948 A1 | 12/2014 |
| DE | 10 2014 202 086 B3 | 2/2015 |
| DE | 10 2013 112 462 A1 | 5/2015 |
| EP | 1 820 579 A1 | 8/2007 |
| EP | 2 027 951 A1 | 2/2009 |

* cited by examiner

VEHICLE SEAT

TECHNICAL FIELD

The present invention relates to a vehicle seat, in particular to an assembly group of an adjustment mechanism of a vehicle seat.

BACKGROUND

FIG. 1 shows a perspective view of a section of a height adjustable seat part 1 of a vehicle seat according to the prior art comprising the seat part 1 and a backrest (not shown) connected to the seat part 1. The seat part 1 is arranged on a vehicle floor of a vehicle (not shown) longitudinally adjustable via a guide rail arrangement 7. The seat part 1 comprises a first side part 21 and a second side part (not shown) forming a seat frame, wherein a rear cross tube 4 and a front cross tube (not shown) extend there between. The rear cross tube 4 is mounted pivotably to the side parts 21 and carries a first rocker 3 and a second rocker (not shown) which form a rear rocker pair. An arc weld 40 axially secures an end 41 of the cross tube 4.

A front rocker pair is formed by a third and fourth rocker which form together with the first and second rocker two parallel four joints for height adjustable connection of the side parts to the guide rail arrangement 7.

The guide rail arrangement 7 is formed by two parallel guide rail pairs extending along a vehicle longitudinal direction from which a section of a first guide rail pair is shown in FIG. 1. The upper guide rail 71a is pivotably connected to the rocker 3, while the lower guide rail 71b is connected to the vehicle floor.

The rockers are part of a height adjustment mechanism together with a manual drive unit or an electromotive drive unit 8 which allows for raising or lowering the seat part 1 relative to the guide rail arrangement 7 or vehicle floor, respectively, by pivoting the rockers. The drive unit 8 comprises a manually driven lever or hand wheel or an electrical motor and a gear with an output pinion, which are connected to the side part 21. The output pinion engages in a toothing of a tooth segment connected to the cross tube 4 and can be rotated in respect to the tooth segment for adjusting the seat height.

When operating the height adjustment mechanism the first rocker 3 arranged on the first end 41 of the cross tube 4 is driven and moved by means of the drive unit 8, whereby the adjustment movement is transferred synchronically to the second rocker connected to a second end of the cross tube 4 via the cross tube 4. In this manner the first and second rockers of the rear rocker pair are pivoted, the seat part 1 is adjusted thereby and the third and fourth rockers of the front rocker pair are moved passively. Thus, the rear and front rocker pairs can be pivoted for this purpose along a pivot direction parallel to each other in order to raise or lower the seat part 1 relative to the guide rail arrangement 7 by pivoting the rear and front rocker pairs.

To leave sufficient space between the side part 21 and the first rocker 3 for mounting the drive unit 8 to the side part 21 and to ensure a play-free connection of the first rocker 3 and the side part 21, a plastic spacer 9 is arranged on the first end 41 of the cross tube 4 between the side part 21 and the first rocker 3. For optical and design reasons it is required that the visible elements of the seat part 1, in particular the guide rail arrangement 7 and the rockers have to be coated. However, since the coating of the visible parts has to be done after the assembly of the height adjustment mechanism by a supplier of the seat part 1 the complete seat part 1 including a side part and the cross tube 4 are also coated which causes additional costs.

Moreover, coating of the above identified part requires a need for a non-conductive bushing whereas no coating allows for the potential to just use grease without bushings or a conductive bushing.

SUMMARY OF THE INVENTION

It is an object of the present invention to reduce the complexity of the vehicle seat, in particular the part complexity of the height adjustment mechanism of the vehicle seat and thus to facilitate the assembly of the vehicle seat and the height adjustment mechanism, respectively.

It is an additional object of the present invention to provide a cost effective concept by making use of standardized parts for different sizes and configurations of vehicle seats and for manufacturing vehicle seats of varying size and structure.

It is a further object of the present invention to reduce the number and size and thus the surface area to be coated.

In a first aspect, a vehicle seat comprises a seat part for providing a seat surface for a seat occupant, which seat part comprises two side parts between which a cross tube extends along a pivot axis and an adjustment mechanism comprising a plurality of rockers which are pivotably coupled to the seat part. The cross tube is divided into a long tube element and a short tube element, the long tube element extending between the side parts of the seat part and the ends of the cross tube are inserted into openings of the side parts whereas the short tube element is connected in a torsionally locked manner both to a first rocker and to the long tube element.

The cross tube hence combines a long tube element extending between the side parts of the seat part whereby the ends of the long tube element are inserted into openings of said side parts and a short tube element which is connected in a torsionally locked manner both to a first rocker and to the long tube element. The separation of the cross tube into a long tube element and a short tube element reduces the complexity of the height adjustment mechanism and thus of the vehicle seat and facilitates the assembly of the vehicle seat and the height adjustment mechanism, respectively, and provides a cost effective concept by using a standard long tube element for different sizes and configurations of vehicle seats and different short tube elements for adapting the cross tube to the individual size and structure of different vehicle seats for manufacturing vehicle seats of varying size and structure.

Moreover, a separation of the cross tube into a long tube element and a short tube element allows for a coating of those parts only which have to be coated and to leave the remaining parts such as the side parts and the cross tube uncoated, thus reducing the number and size and thus the surface area of the height adjustment mechanism to be coated.

In one aspect, the outer diameter of at least the end of the long tube element is smaller than the inner diameter of the short tube element such that the long tube element may be inserted into the short tube element. This facilitates a connection of the long tube element and the short tube element in a torsionally locked manner by securing the interfacing parts of said long tube element and said short tube element together by laser welding, screwing, riveting or press-fitting.

In another aspect the interfacing parts of the long tube element and the short tube element have a shape other than circular such that a rotation of the long tube element effected by the drive unit is transmitted to the short tube element with or without laser welding, screwing, riveting or press-fitting those two elements.

In a further aspect, the end of the short tube element facing one of the side parts abuts the respective side part forming a spacer between the respective side part and the first rocker such that no additional spacer is necessary for leaving sufficient space between the side part and the first rocker for arranging the drive unit at the side part and for ensuring a play-free connection of the first rocker and the side part, thus reducing the number of parts of the adjustment mechanism.

Furthermore, in order to improve the necessary torsional lock between the short tube element and the first rocker the short tube element has a tube section extending along a longitudinal direction and bead sections formed on the short tube element and radially protruding with respect to the tube section, whereas the first rocker has a planar section and a first opening formed in the planar section, wherein the short tube element extends through the first opening such that the tube element with the bead sections abuts the planar section of the first rocker.

In an embodiment of the present invention the adjustment mechanism comprises a guide rail arrangement for the longitudinally adjustable arrangement of the vehicle seat in a vehicle and a height adjustment mechanism comprising a plurality of rockers which are pivotably coupled to said seat part and said guide rail arrangement, which connect said seat part to said guide rail arrangement so as to be adjustable in height, said rockers being pivotably mounted on the guide rail arrangement via a holding element.

BRIEF DESCRIPTION OF THE DRAWINGS

The various features and advantages of the present invention may be more readily understood with reference to the following detailed description and the embodiments shown in the drawings. Herein.

DETAILED DESCRIPTION

Figure 1:
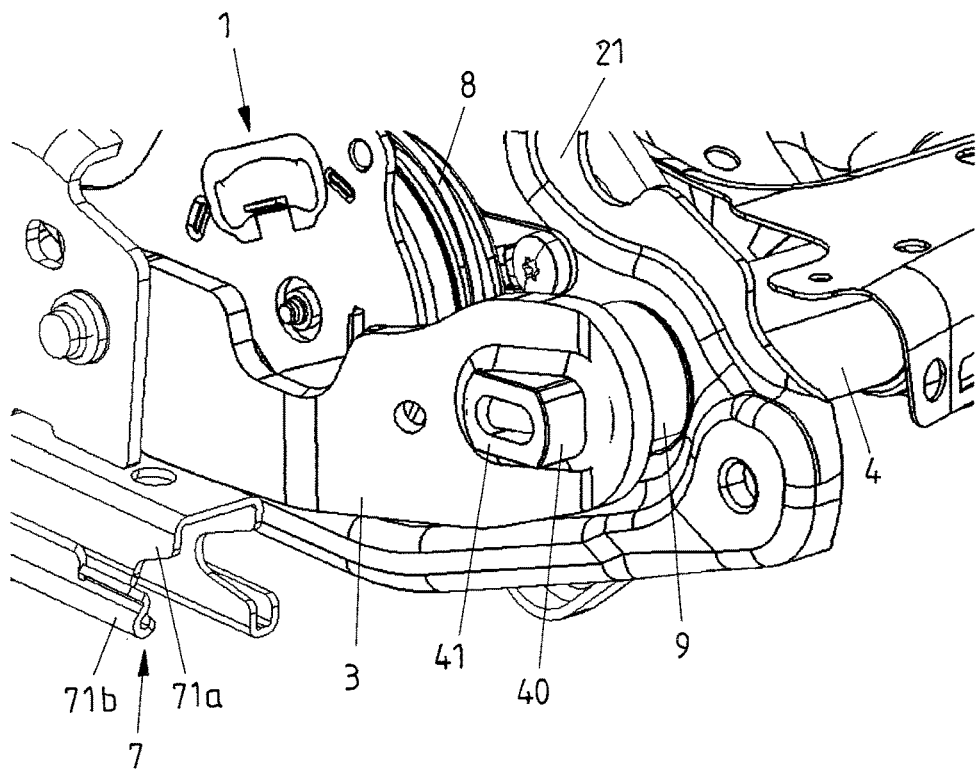
FIG. 1 shows a perspective view of a section of a height adjustable seat part of a vehicle seat according to the prior art.

Subsequently, embodiments of the invention shall be described in detail with reference to the drawings. In the drawings, like reference numerals designate like structural elements.

It is to be noted that the embodiments are not limiting for the invention, but merely represent illustrative examples.

Figure 2:
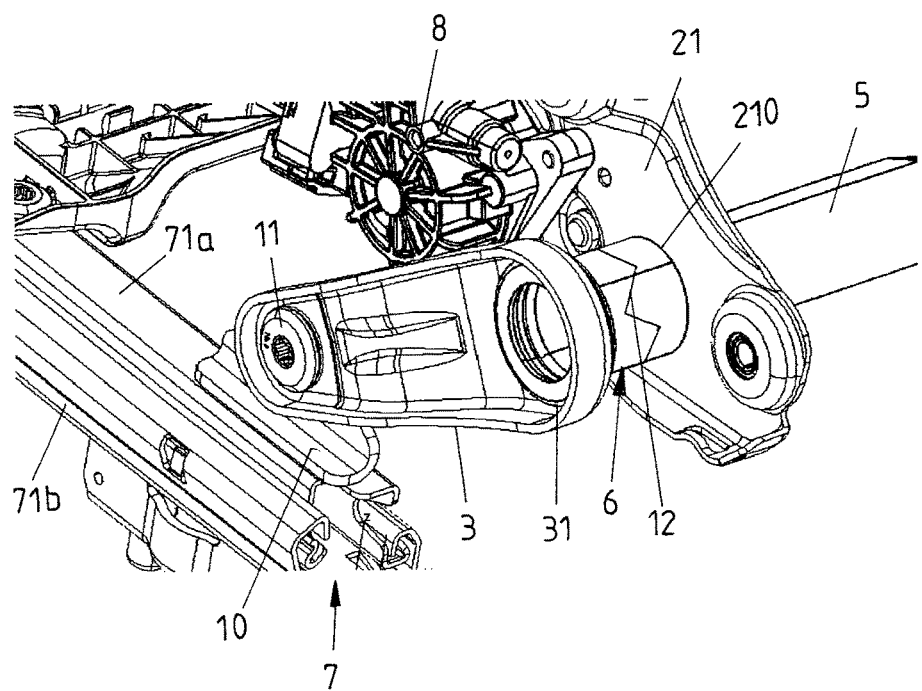
FIG. 2 shows a perspective partial view of an adjustable seat part of a vehicle seat according to the present invention.

FIG. 2 shows in a perspective partial view of an adjustment mechanism, in particular a height adjustment mechanism, for a vehicle seat a side part 21 which in connection with a second side part and rear and front cross tubes extending there between forms a seat frame as described herein above. The side part 21 comprises a bore 210 through which a long tube element 5 extends into a short tube element 6 which is connected in a torsionally locked manner to a first rocker 3. The first rocker 3 is pivotably mounted to a holding element 10 via a joint 11. The holding element 10 is firmly connected to an upper guide rail 71a which is slidable connected to a lower guide rail 71b which is connected to a (not shown) vehicle floor. The upper guide rail 71a and the lower guide rail 71b form one of two parallel guide rail pairs of a guide rail arrangement 7 extending along a vehicle longitudinal direction.

The first rocker 3 is part of the adjustment mechanism together with a manual or electromotive drive unit 8, which upon rotation in either direction raises or lowers the seat part 1 relative to the guide rail arrangement. The drive unit 8 comprises either a manually driven lever or handwheel or an electrical motor and a gear with an output pinion, which are connected to the side part 21. The output pinion engages in a toothing of a tooth segment 80 connected to the long tube element 5 according to FIG. 3 and can be rotated in respect to the tooth such that, by pivoting the first rocker 3, the vehicle seat may be adjusted in its height position, for instance.

Figure 3:
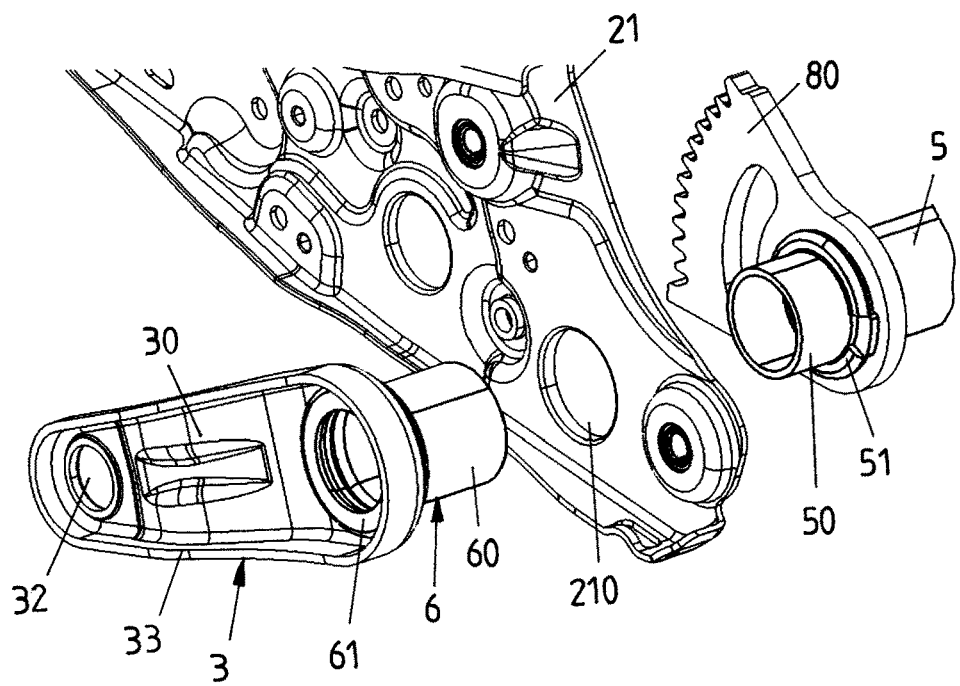
FIG. 3 shows a perspective partial view of an adjustable seat part of a vehicle seat according to FIG. 2 prior to connecting the short tube element and the long tube element.

The first rocker 3, as visible in FIGS. 2 and 3, comprises a planar section 30, a first opening 31 and a second opening 32 formed therein at opposite ends of the planar section 30 of the first rocker 3. The planar section 30 herein is substantially planar, which shall be understood to mean that the section in a substantially planar fashion extends along a plane, but may include a curvature for an increased stability as visible in FIGS. 2 and 3, such that the planar section 30 not necessarily is entirely flat.

The first opening 31 serves to receive the short tube element 6, whereas the second opening 32 formed in the opposite end of the planar section 30 of the first rocker 3 receives the joint 11 for pivotably connecting the first rocker 3 and the holding element 10 which is connected to the upper rail 71a of the guide rail arrangement 7 such that, by pivoting the first rocker 3, the vehicle seat may be adjusted in its height position.

The planar section 30 is surrounded by a flange 33 protruding from the planar section 30 along a longitudinal direction along which the short tube element 6 extends when it is connected to the first rocker 3. The flange 33 may for example serve to increase the structural stability of the first rocker 3.

FIG. 3 shows in a perspective partial view the height adjustable seat part of a vehicle seat according to FIG. 2 prior to connecting the long tube element 5 and the short tube element 6.

Figure 4:
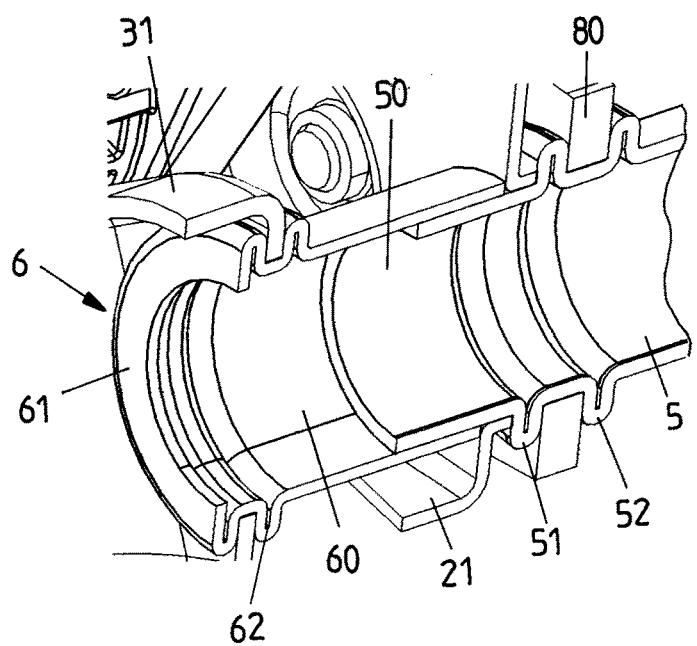
FIG. 4 shows a separate sectional view of the interfacing parts of the short tube element and the long tube element after assembly.

As visible from FIGS. 3 and 4 the short tube element 6 comprises a tube section 60 extending along a longitudinal direction and two bead sections 61, 62 formed on the tube section 60 for axially fixing the short tube element 6 to the first rocker 3. The bead sections 61, 62 may for example be formed by cold forming or by hot forming the short tube element 6 such that the part of the planar section 30 of the first rocker 3 surrounding the first opening 31 of the first rocker 3 is received in between the bead sections 61, 62 such that the short tube element 6 is axially fixed to the first rocker 3, as shown in FIG. 4.

For connecting the first rocker 3 to the short tube element 6, an axially inner bead section 62 is formed on the tube section 60 of the short tube element 6 in a certain distance from an end of the tube section 60 such that the inner bead section 62 radially protrudes from the tube section 60.

The short tube element 6 is then inserted with its free end adjoining the inner bead section 62 into the first opening 31 of the first rocker 3 such that the inner bead section 62 abuts, with an inner side opposite an outer side of the planar section 30 of the first rocker 3 around the first opening 31 of the first rocker 3. Subsequently, an axially outer bead section 61 is formed on the short tube element 6, thus axially fixing the short tube element 6 to the first rocker 3.

For torsionally locking the short tube element 6 to the first rocker 3 such that torsional forces may be transferred in between the short tube element 6 and the first rocker 3 different techniques may be used.

In a first embodiment the first opening 31 in the planar section 30 of the first rocker 3 has a cross-section other than round, i.e. for example a hexagonal cross-section, a beveled cylindrical cross-section and the like in combination with a corresponding portion of the tube section 60 between the inner bead section 62 and the end of the tube section 60 of the short tube element 6. While forming the inner bead section 62, or after forming the inner bead section 62, the cylindrical portion of the tube section 60 between the inner bead section 62 and the end of the tube section 60 of the short tube element 6 is suitably deformed using a stamping technique to obtain a profile at least of the part of the tube section 60 between the inner bead section 62 and the axially outer bead section 61 other than round, i.e. by forming for example a bevel at the cylindrical portion of the tube section 60 or by forming a hexagonal portion.

In a second embodiment protrusion elements may be formed to the inner bead section 62 and/or axially outer bead section 61 of the short tube element 6 such that the protrusion elements engage with openings radially extending from the first opening 31 of the first rocker 3. Via the engagement the first rocker 3 is torsionally locked to the short tube element 6 such that torsional forces may be transferred in between the short tube element 6 and the first rocker 3.

In a third embodiment the inner bead section 62 and/or axially outer bead section 61 of the short tube element 6 may be laser welded or riveted to the planar section 30 of the first rocker 3 around the first opening 31 of the first rocker 3 such that the short tube element 6 is torsionally locked to the first rocker 3 to transfer torsional forces between the short tube element 6 and the first rocker 3.

As mentioned above a tooth segment 80 of the drive unit 8 is fastened to the long tube element 5 in particular by forming two foldings 51, 52 at both sides of a bore of the tooth segment 80 according to FIG. 4 which press-fit the tooth segment 80 to the long tube element 5.

Alternatively, corresponding to the torsional locking between the short tube element 6 and the first rocker 3 as described herein above a cross-section other than round may be formed both to the bore of the tooth segment 80 and the portion of the long tube element 5 between the two foldings or beads 51, 52 for torsionally locking the tooth segment 80 to the long tube element 5 to transfer torsional forces between the tooth segment 80 and the long tube element 5.

The outer diameter of the long tube element 5 is smaller than the inner diameter of the short tube element 6 by a degree that at least an interfacing part 50 of the long tube element 5 is insertable in the tube section 60 of the short tube element 6. After insertion of the interfacing part 50 of the long tube element 5 in the tube section 60 of the short tube element 6 the interfacing part 50 and an interfacing part of the tube section 60 are secured together by laser welding as indicated by a weld 12 in FIG. 2, screwing or riveting.

Alternatively, the outer diameter of the long tube element 5 is smaller than the inner diameter of the tube section 60 of the short tube element 6 by a degree that the interfacing part 50 of the long tube element 5 may be press-fitted to the interfacing part of the tube section 60.

In a further alternative the interfacing part 50 of the long tube element 5 and the tube section 60 of the short tube element 6 have a shape other than circular to assure a torsionally locked connection between the long tube element 5 and the short tube element 6 by means of positive locking.

As shown in FIG. 4 after connecting the interfacing part 50 of the long tube element 5 and the tube section 60 of the short tube element 6 the front end of the short tube element 6 facing the side part 21 abuts the surface of the side part 21 around the bore 210 forming a spacer between the side part 21 and the first rocker 3.

For coating the visible parts of the height adjustment mechanism it is not necessary to coat the complete height adjustment mechanism but merely the guide rail arrangement 7 and the rockers but not the large surface of the side parts and the long tube element 5 and short tube element 6 forming the cross tube.

The embodiment described herein is not limiting for the invention as set forth in the claims, but merely provide illustrative examples. The invention can be carried out in an entirely different manner in entirely different embodiments.

REFERENCE NUMERALS 1 adjustable seat part
3 (first) rocker
4 (rear) cross tube
5 long tube element
6 short tube element
7 guide rail arrangement
8 drive unit
9 plastic spacer
10 holding element
11 Joint
12 weld
21 side part
40 Arc weld
41 first end of the cross tube
50 interfacing part of the long tube element
51, 52 foldings
60 tube section of the short tube element
61 outer bead section of the short tube element
62 inner bead section of the short tube element
71a upper guide rail
71b lower guide rail
80 tooth segment
210 bore
30 planar section of the first rocker
31 first opening of the first rocker
32 second opening of the first rocker
33 flange

The invention claimed is:
1. A vehicle seat comprising:
a seat part having a seat surface for a seat occupant, said seat part comprising two side parts between which a cross tube extends along a pivot axis; and
an adjustment mechanism comprising a plurality of rockers which are pivotably coupled to said seat part,
said cross tube being divided into a long tube element and at least a first short tube element,
said long tube element having a tube section extending along a longitudinal direction between said two side parts of said seat part and being inserted into first and second openings of said side parts,
said first short tube element having a tube section extending along a longitudinal direction and two bead sections formed on the short tube element at a certain axial distance to each other and radially protruding with respect to the tube section, said first short tube element being connected in a torsionally locked manner both to a first end of said long tube element and to a first rocker of the plurality of rockers, said first rocker having a planar section and a first opening formed in the planar section, wherein the first short tube element extends through the first opening with the bead sections abutting the planar section of the first rocker for axially fixing the first short tube element to the first rocker, which is arranged between said two bead sections, and a front end of said first short tube element, which faces a first side part of said two side parts and abuts said first side part, forming a spacer between said first side part and said first rocker.

2. The vehicle seat according to claim 1, wherein said long tube element is connected to the first and a second short tube element at either end of said long tube element, said first and second short tube element being connected to the first and a second rocker and to said long tube element in a torsionally locked manner.

3. The vehicle seat according to claim 1, wherein the adjustment mechanism comprises a guide rail arrangement for a longitudinally adjustable arrangement of the vehicle seat and a height adjustment mechanism comprising four rockers of the plurality of rockers which are pivotably coupled to each end of said two side parts and said guide rail arrangement, which connect said seat part to said guide rail arrangement so as to be adjustable in height, said four rockers being pivotably mounted on the guide rail arrangement via a holding element.

4. The vehicle seat according to claim 1 or 3, wherein said adjustment mechanism comprises a manual or electromotive drive unit for raising or lowering the seat part relative to the guide rail arrangement, an output pinion of said drive unit engaging a tooth segment having a bore, at both sides of which two foldings are formed on the long tube element radially protruding with respect to the long tube element, which two foldings press-fit the tooth segment to the long tube element for pivoting the first rocker.

5. The vehicle seat according to claim 1, wherein the outer diameter of at least the first end of said long tube element is smaller than the inner diameter of said first short tube element, said first end of said long tube element being inserted into said first short tube element.

6. The vehicle seat according to claim 5, wherein the interfacing parts of said long tube element and said short tube element have a shape other than circular.

7. The vehicle seat according to claim 5, wherein the interfacing parts of said long tube element and said first short tube element are secured together by laser welding, screwing or riveting.

8. The vehicle seat according to claim 5, wherein the interfacing parts of said long tube element and said first short tube element are press-fitted.

* * * * *